US 6,989,067 B2

(12) United States Patent
Armstrong, Jr. et al.

(10) Patent No.: US 6,989,067 B2
(45) Date of Patent: Jan. 24, 2006

(54) METHOD AND APPARATUS FOR APPLICATION OF MATERIAL TO CORE

(75) Inventors: J. Dean Armstrong, Jr., Raymore, MO (US); Lee Meyers, Peculiar, MO (US); Mark Andrews, Peculiar, MO (US)

(73) Assignee: Roller Equipment Manufacturing Co., Inc., Grandview, MO (US)

( * ) Notice: Subject to any disclaimer, the term of this patent is extended or adjusted under 35 U.S.C. 154(b) by 302 days.

(21) Appl. No.: 10/412,849

(22) Filed: Apr. 14, 2003

(65) Prior Publication Data

US 2004/0200562 A1 Oct. 14, 2004

(51) Int. Cl.
*B65H 81/00* (2006.01)

(52) U.S. Cl. ............. 156/187; 156/117; 156/195; 156/397; 156/425; 156/429; 156/172

(58) Field of Classification Search ............. 156/117, 156/172, 173, 175, 185, 187, 195, 397, 244.13, 156/425, 429
See application file for complete search history.

(56) References Cited

U.S. PATENT DOCUMENTS

| 4,240,863 A | | 12/1980 | Vinton | |
| 4,279,683 A | * | 7/1981 | Landsness | 156/397 |
| 4,596,619 A | | 6/1986 | Marks | |
| 4,959,110 A | * | 9/1990 | Russell | 156/187 |
| 5,007,343 A | * | 4/1991 | Marks | 156/173 |
| 5,022,952 A | | 6/1991 | Vaniglia | |
| 6,372,070 B1 | * | 4/2002 | Iizuka et al. | 156/117 |
| 6,723,194 B2 | * | 4/2004 | Takaoka | 156/117 |

FOREIGN PATENT DOCUMENTS

FR 2579130 3/1985

* cited by examiner

*Primary Examiner*—Jeff H. Aftergut
(74) *Attorney, Agent, or Firm*—Chase Law Firm, L.C.

(57) ABSTRACT

A strip builder for winding a material strip about a rotating core includes a traveling applicator head assembly for receipt of the material strip from an upstream extruder station and transport of the strip to a downstream rotating core. The assembly includes a central support arm in longitudinal travel along the rotating core. Attached to the central support arm is a belt roller, an applicator roller spaced therefrom and a belt drive coupled therebetween. A conveyor belt is wound about the belt roller. Upon rotation of the core, the rotation of the applicator roller rotates the belt roller coupled thereto. Rotation of the belt roller drives the conveyor belt towards the core with the material strip thereon. Upon the belt passing between the belt roller and displaced applicator roller, the strip is stretched and deposited onto the applicator roller for subsequent deposit onto the rotating core. A traveling stitching roller subsequently smoothes the material strip deposited on the rotating core. The applicator and stretching rollers are pivotable relative to the central support arm such that pressure along the central support arm can be equally distributed to the applicator and stretching rollers and onto the rotating core.

20 Claims, 4 Drawing Sheets

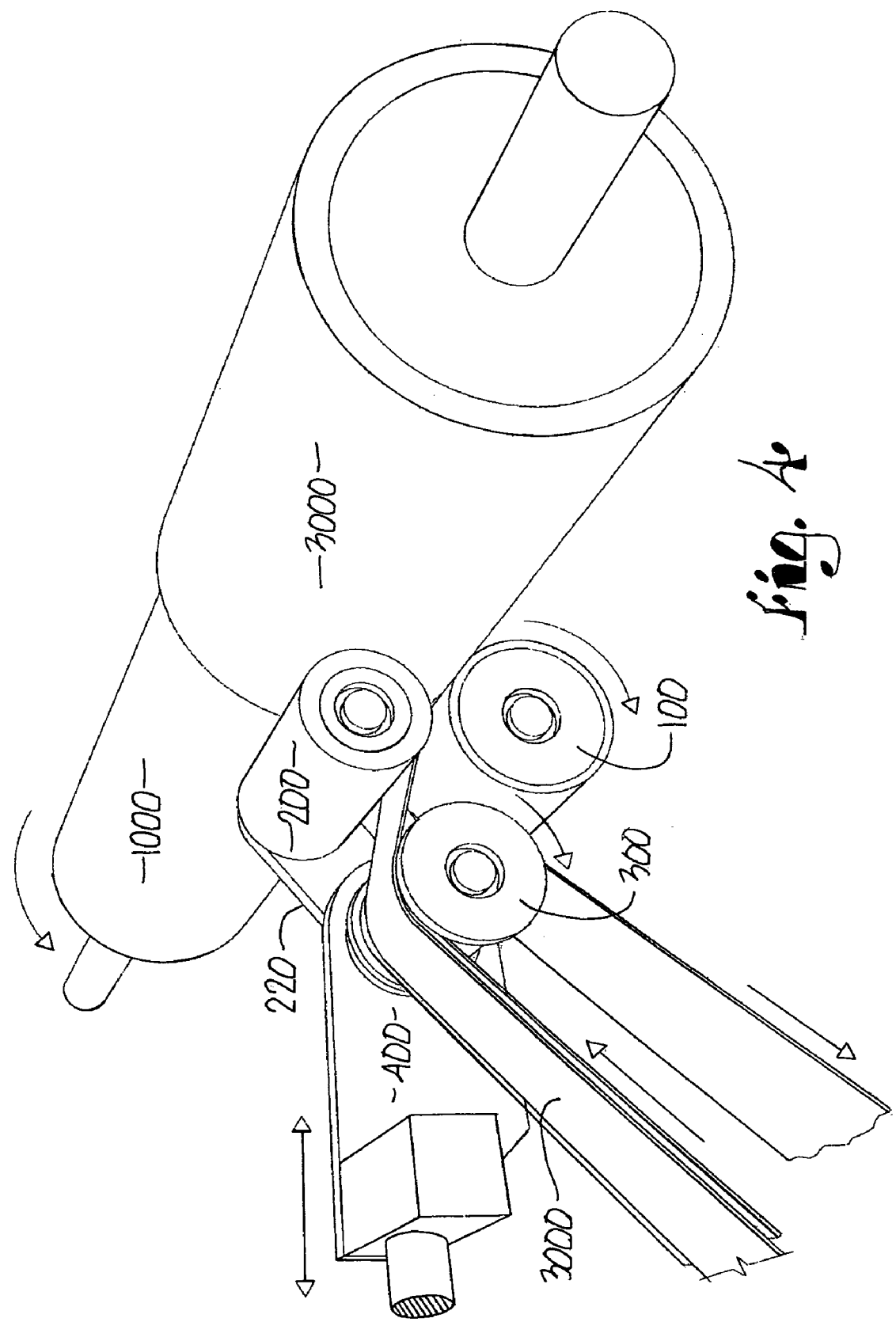

METHOD AND APPARATUS FOR APPLICATION OF MATERIAL TO CORE

BACKGROUND OF THE INVENTION

This invention relates to an application system and, more particularly, to an improved applicator head assembly for applying a strip of elastomeric material about a roller, mandrel, wire, cable and other similarly shaped cores.

Various types of products call for the use of a material strip wound about a cylindrical core. Such cores can include mandrels, rollers, pipe and other similarly shaped materials. Roller covering equipment, known as strip builders, are utilized which provide a method for winding a strip of elastomeric material about a rotating roller. Basically, the apparatus includes a traveling extruder for forming a strip of the elastomeric material. The extruder is mounted on a traveling platform that moves along the length of the rotating core. As the core rotates, the strip is wrapped about the core, such strip being pressed thereon by a head which concurrently travels along the length of the core. This process continues until a desired thickness of the material is wound about the core. Once achieved, the core is then heat treated, cured and precision machined such that a smooth elastomeric surface is presented about the core.

An effective application of the strip of the elastomeric material onto the roller core is desired. This elastomer could be thermoplastic or thermoset in nature and could be rubber or plastic. Thus, much interest has been directed to the design of an efficient applicator head that avoids the problems arising in the prior art. For example, heat build up problems have arisen due to the highly heated strip (400° F.) which is to be wound about the rotating core. Also, the strip of elastomeric material may stretch and/or sag between the extruder and the roller. Thus, the ability to effectively regulate the conveyance of the strip between the extruder and the roller core is of importance.

Accordingly, in response thereto, we have invented a novel applicator head assembly for use in a strip builder system. The head assembly comprises a stitching roller, an applicator head roller, a belt roller and a strip conveyor belt wound about the applicator and belt rollers. Upon rotation of the core, e.g., a mandrel, the contacting applicator roller rotates, which in turn rotates the belt roller due to a drive belt extending therebetween. Concurrently, a conveyor belt extending from an upstream extruder and about the downstream belt roller is driven into a gap between the applicator and belt rollers. As such, the elastomeric strip is deposited from the belt onto the adjacent downstream applicator roller. The rotating applicator roller then deposits the strip onto the adjacent rotating core. A stitching roller, as driven by the rotating core, smoothes the overlap of the elastomeric strip being wound about the core. The relationships among the belt roller, applicator roller and stitching roller can be adjusted according to the size of the rotating core so as to enhance the strip build up process. Accordingly, we have found that our assembly effectively addresses the prior heat build up and strip sagging problems and affords effective advantages in the strip build up process.

It is therefore a general object of this invention to provide an improved apparatus for deposit of a strip of material about a rotating core.

Another object of this invention is to provide an apparatus, as aforesaid, which includes an improved applicator head assembly for enhancing the transfer of the strip from an upstream extruder onto the downstream rotatable core.

A further object of this invention is to provide an apparatus, as aforesaid, which includes a belt roller, a conveyor belt and applicator roller, the conveyor belt being driven by the downstream applicator roller in contact with the rotating core.

Still a further object of this invention is to provide apparatus, as aforesaid, which effectively transfers the strip from the upstream conveyor belt onto a downstream applicator roller to prevent heat build up and sagging problems.

Another object of this invention is to provide apparatus, as aforesaid, which includes a stitching roller for smoothing the strip about the rotating core, the angle between the stitching and applicator rollers being adjustable.

A further object of this invention is to provide an apparatus, as aforesaid, wherein the relationship of the stitching and applicator rollers, relative to the rotating core, can be adjusted in response to the size of the rotating core.

Still another object of this invention is to provide an apparatus, as aforesaid, presenting structure allowing for an equal distribution of pressure by the applicator and stitching rollers onto the rotating core.

Another object of the invention is to provide apparatus, as aforesaid, wherein the surface speed of core rotation regulates the rate of transfer of the strip onto the rotating core.

Another object of the invention is to provide a regulated ratio between the surface speed of the applicator roller and the surface speed of the conveyor belt roller and belt therearound to preclude gaps or wrinkles in the elastomer strip prior to application.

Other objects and advantages of this invention will become apparent from the following description taken in connection with the accompanying drawings, wherein is set forth by way of illustration and example, a now preferred embodiment of this invention.

BRIEF DESCRIPTION OF THE DRAWINGS

FIG. 4 is a perspective, diagrammatic view showing the contact of the strip applicator apparatus onto a core in the form of a mandrel.

DESCRIPTION OF THE PREFERRED EMBODIMENT

Figure 1:
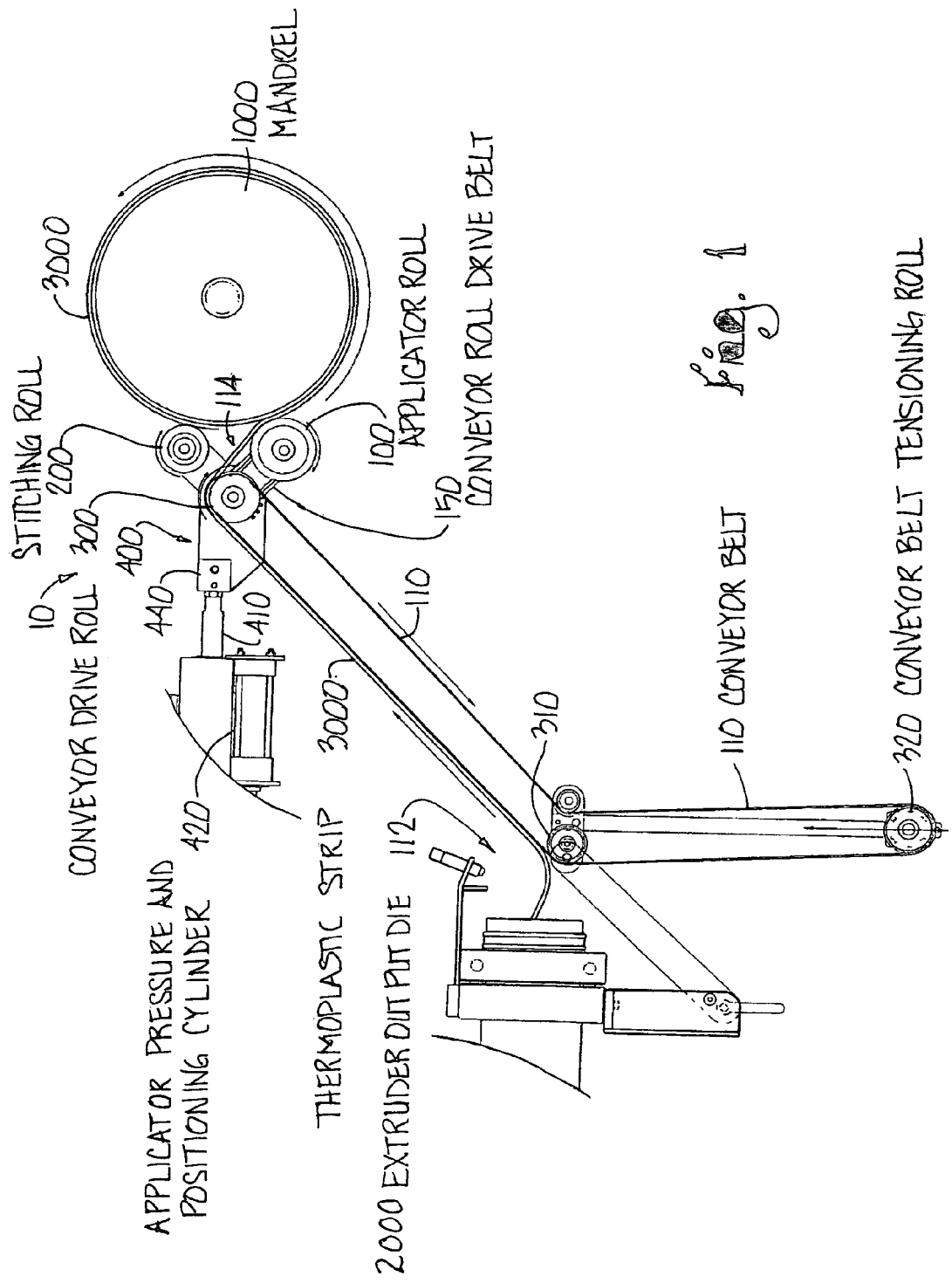
FIG. 1 is a view of the strip build up system with the applicator head assembly incorporated therein.

Turning more particularly to the drawings, FIG. 1 diagrammatically shows a strip build up system including apparatus 10 intermediate the upstream elastomeric strip extruder station 2000 and downstream mandrel 1000. It is understood that the extruder 2000 along with apparatus 10 "travels" along the longitudinal axis of the rotatable mandrel 1000, such an extruder "travel" being found in prior strip build up assemblies. Alternatively, the mandrel may travel relative to a stationary extruder. The apparatus 10 includes a non-stick applicator roller 100 and a non-stick stitching roller 200 in contact with the mandrel 1000 about which a thermoplastic strip 3000 is to be wound. The strip 3000, as extruded at production station 2000, is deposited onto a continuous Teflon® coated conveyor belt 110 as wound about a belt drive roller 300, idler rollers 310 and tension rollers 320. It is understood that the form of the conveyor belt assembly, upstream from belt roller 300, may be of various designs. Upon deposit of strip 3000 at the input zone 112 of belt 110, the strip 3000 is then belt 110 conveyed downstream through a path towards the discharge zone 114 adjacent the applicator roller 100 as spaced from the conveyor belt roller 300. At the discharge zone 114, the belt 110 path reverses to an upstream direction and enters the gap between the rollers 100, 300. This action deposits the strip 3000 onto the applicator roller 100. A speed differential between the applicator roller 100 and conveyor drive roller 300 enables the stretching of the strip 3000 to be regulated. The rotating applicator roller 100 then urges the strip 3000 without sag onto the rotating mandrel 1000 with the strip overlap being smoothed by the rotating stitching roller 200.

More particularly the assembly 10, which conveys the strip 3000 from extruder 2000 to mandrel 1000, includes a central support arm 400 which is connected to a push/pull shaft 410 as controlled by an applicator pressure and positioning cylinder 420 having an upstream pressurized air source. This push/pull apparatus is supported on upstream framework (not shown) which is designed to "travel" along the mandrel 1000 and support the production station 2000. It is understood that such framework/extruder "travel" with supporting framework is known. A block 440 on the end of the push/pull rod 410 is joined to a block 450 on the central support arm 400. Thus, the longitudinal extension and pressure of the support arm 400 can be adjusted by regulating the pressure in the cylinder 420 which ultimately regulates the pressure of the applicator 100 and stitching 200 rollers against the mandrel 1000. The central support arm 400 includes a central aperture 420 having a plurality of apertures 430 therearound. The central arm 400 supports the stitching roller arm 220 and belt roller arm 120 with the to-be-described rollers attached thereto.

The stitching roller assembly includes an arm 220 with rotatable roller 200 thereon. Extending from the arm 220 is a pin 230 for insertion into a selected aperture in the hub of the conveyor belt drive roller 300 as to be subsequently described. The stitching roller assembly includes a first aperture 240 presenting a reduced aperture 250 therein for alignment with the aperture 420 on the support arm 400, these apertures 240, 250 receiving the axle 340 and hub 350 of belt roller 300 therein with the central support arm 400 therebetween. This axle 340 provides for even distribution of applied pressure along arm 400 and between the applicator roller 100 and stitching arm 200.

Figure 3:
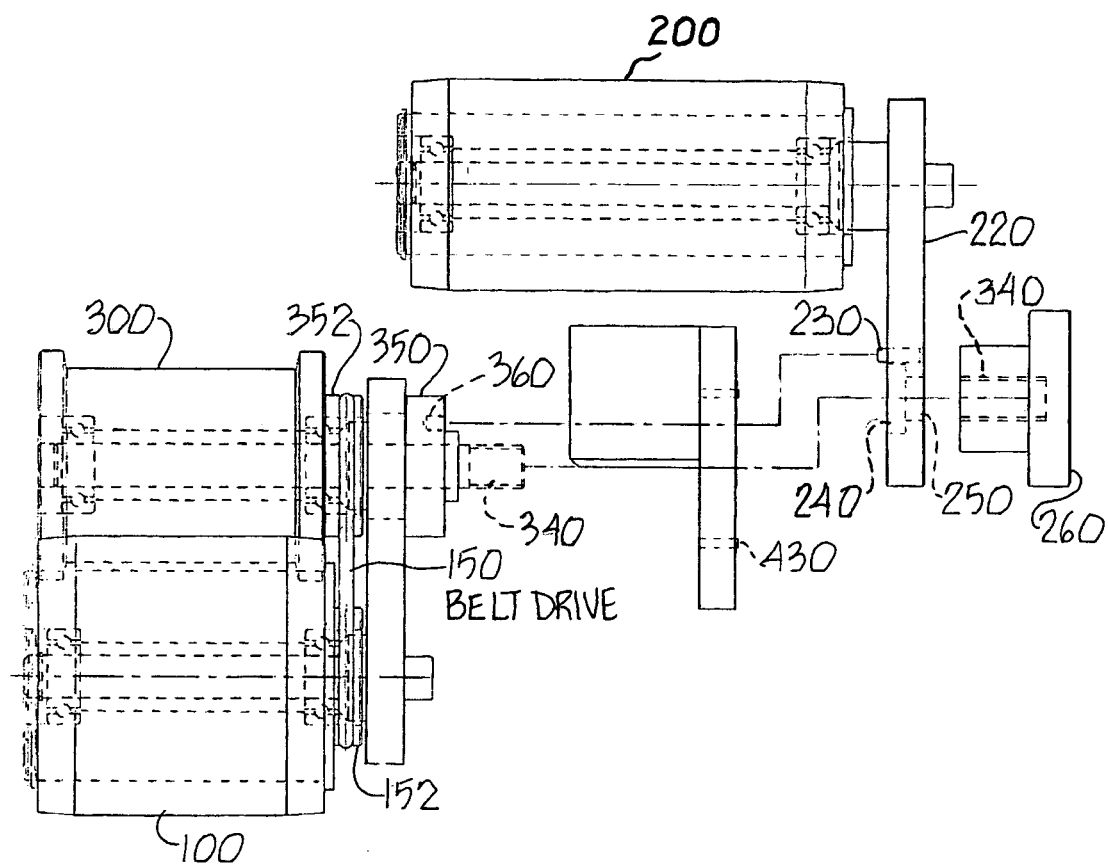
FIG. 3 is a view particularly showing the interrelationship among the stitching roller, applicator roller, belt roller and support arm of FIG. 2.

The applicator roller assembly includes an arm 120 for support of the applicator roller 100 and conveyor belt roller 300 at opposed ends thereof. The applicator roller 100 presents a non-stick surface adapted to contact the mandrel 1000 with a selectable pressure as regulated by the above-described push/pull cylinder assembly. Opposite the applicator roller 100 is a conveyor belt roller 300. A drive belt 150 is wound about flanged rims 152, 352 rotatable with the rollers 100, 300. Thus, movement of drive belt 150 presents a rotation of rollers 100, 300. As best shown in FIG. 3, the belt drive roller 300 presents a hub 350 and projecting axle 340 for extension through aperture 420 of central support arm 400 and into the apertures 240, 250 on the stitching arm 220. Accordingly, hub 350 nests within aperture 240 of arm 220 with axle 340 extending into aperture 250. The larger applicator roller 100 drives the smaller conveyor drive roller 300 using the same pitch diameter of flanged rims causing a difference of roller surface speeds. The differential, e.g., 1:25:1, is thus set with the faster roller being the applicator roller 100 but other ratios can be selected. As above noted this differential, presented in part by a difference in roller sizes, enables the stretch of the strip 3000 to be regulated so as to preclude undesirable sag upon transfer of the strip 3000 from belt 110 onto applicator roller 100.

Figure 2:
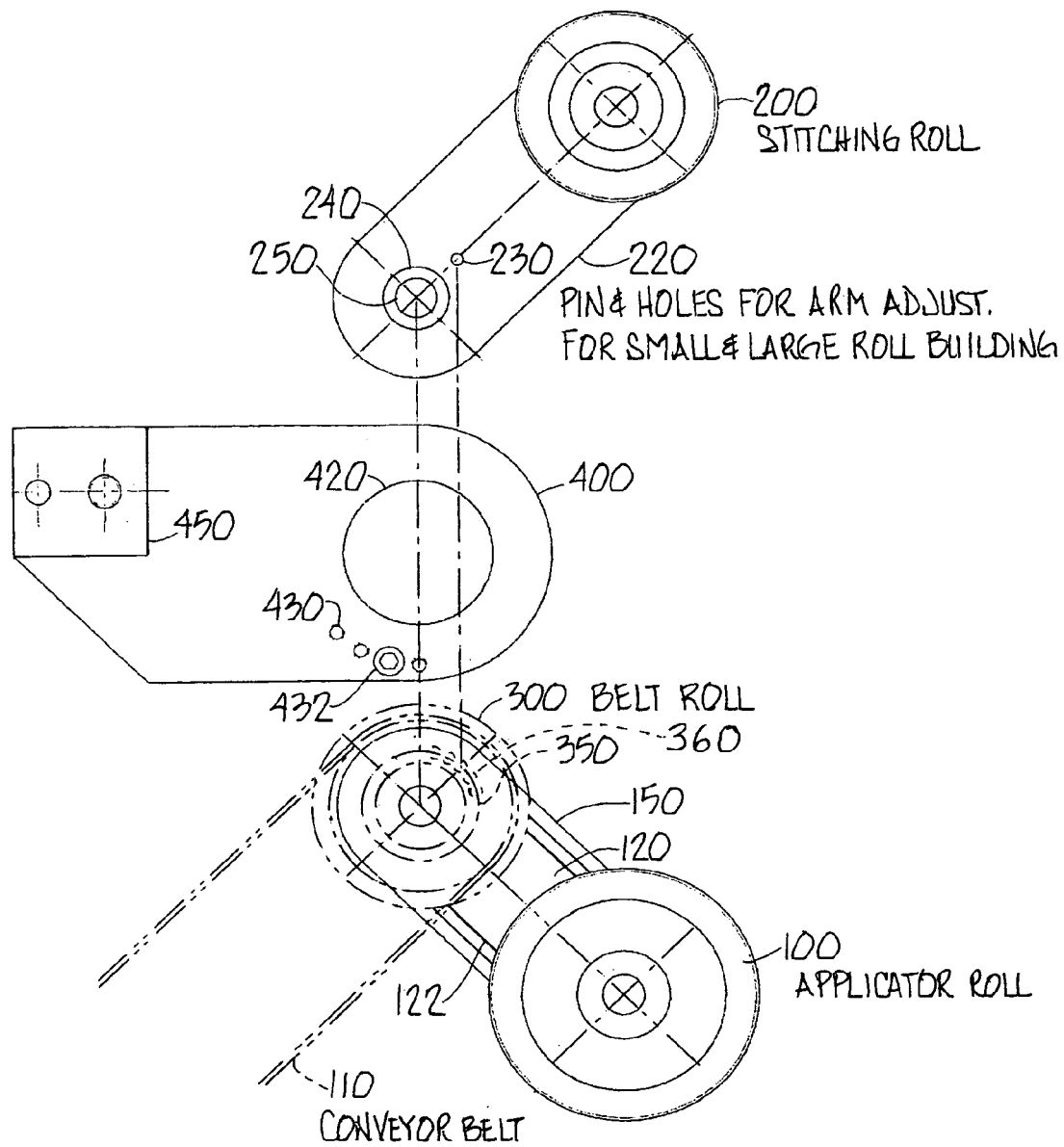
FIG. 2 is an exploded view showing the basic designs of the stitching roller, applicator and belt rollers and support arms therefore.

Located about hub 350 is a plurality of apertures 360 as shown in FIG. 2. Upon extension of hub 350 through aperture 420 of central arm 400, pin 230 can be selectably nested into one of these hub apertures 360. This pin/aperture relationship maintains a selected angular relationship between arms 120, 220 as the pin 230 on the stitching arm 220 engages one of a plurality of apertures 360 about the hub 350 on the belt roller 300. Thus, the gap between the stitching roller 200 and applicator roller 100 has been adjusted corresponding to the adjustable angle of the arms 120, 200. This ability to relatively position these rollers 100, 200 allows mandrels of various sizes to be used, the larger the mandrel 1000 the greater the desired gap between rollers 100, 200. Also, the gap between rollers 100, 200 may be so adjusted as to firmly contact mandrel/cores which may not be perfectly round.

Also, as shown on the support arm 400 is a plurality of apertures 430 for extension of bolt 432 therethrough so as to bear against the lower edge 122 of arm 120. Accordingly, the relationship of the previously adjusted stitching 220 and applicator arms 120 and rollers 200, 100 thereon, relative to the support arm 400, can be set as the bolt 432 extension bears against the underside 120 of the application support arm 400. As such, the downward travel of arm 120 is delimited which delimits any undesirable travel of the applicator 100 and stitching 200 rollers in contact with the rotating mandrel 1000. Also, the applicator roller 100 and stitching roller 200 now rotate relative to a common axis 340 passing through aperture 420 on support arm 400. As such, the pressure delivered to arm 400 by the push/pull rod 410 can be equally distributed to both rollers by adjustment of such structure.

An example of one use is that the upstream extruder station 2000 presents an extruded thermoplastic strip 3000. This thermoplastic strip is deposited onto the adjacent conveyor belt 110 at input zone 112. As the applicator roller 100 is in contact with the rotating mandrel 1000, belt roller 300 is likewise rotated by belt drive 150. In turn, the conveyor belt 110 is driven through a path between the input 112 and discharge 114 zones. As such, the conveyor belt 110 with the thermoplastic strip 3000 thereon is driven downstream into the gap between the belt 300 and applicator rollers 100. At this point the elastomer strip 3000 is deposited from the conveyor belt 110 onto the applicator roller 100 for subsequent deposit on the rotating mandrel 1000. The conveyor belt 110 path between the upstream production station and applicator roller allows for a cool down of the strip 3000 which delimits any heat build up problems associated with the strip. Moreover, the displacement of the belt 110 from the mandrel 1000 also delimits any heat build up problems therebetween. The belt 110 offers support to the strip 3000 to preclude any sagging problems. Again, the control of the differential of roller surface speeds prevents any sagging at the point of transfer from belt 110 to roller 100 as the rate of stretch of the strip can be controlled at such point of transfer.

As above described, the upstream extruder assembly 2000, inclusive of the supporting framework for the above-described assembly 10, "travels" along the longitudinal axis of the returning mandrel 1000. (Alternatively, mandrel 1000 may "travel".) Thus, the elastomer strip 3000 is being wound about the mandrel 1000 with the stitching roller 200 smoothing the edges presented by the strip overlaps.

We have thus found that this apparatus presents an effective method for deposit of a material strip thermoplastic or otherwise, about a rotating core. More particularly the conveyor belt path 110 and its displacement from the mandrel 1000 precludes heat build up problems. Moreover, as belt 110 is now ultimately driven by rotation of mandrel 1000 the deposit rate of the strip onto the mandrel 1000 can be controlled. This control is enhanced by the ability to control mandrel rotation and/or the output speed of the extruder (ratio is set and does not change). Also, the abilities, either singularly or jointly, to adjust the angle/gap between the applicator roller 100 and the stitching roller 200 and to further adjust the position of these adjusted rollers 100, 200 relative to support arm 400 and mandrel 1000 further enhance an effective and safe method and apparatus for a continuous strip application. Finally, the conveyor belt 110, as driven by the rotating mandrel 1000, makes it possible to feed the 400° F. (hot) elastomer strip from the extruder to the mandrel without hand contact. Thus, the problems previously associated with strip build up are variously addressed.

It is to be understood that while certain forms of this invention have been illustrated and described, it is not limited thereto, except in so far as such limitations are included in the following claims and allowable equivalents thereof.

What is claimed is:

1. A method of applying a material strip about a core comprising the steps of:
    providing a core having a central axis, the core rotatable about said axis;
    producing a strip of material for winding about the rotatable core;
    providing a conveyor belt defining a path having a first input zone for deposit of said produced strip thereon and a second downstream discharge zone for release of the material strip therefrom;
    providing a belt roller for driving said conveyor belt and strip thereon between said first and second zones;
    providing an applicator roller adjacent said discharge zone of said conveyor belt and in contact with the core;
    linking rotation of said applicator roller with said belt roller;
    rotating said core whereby to rotate said contacting applicator roller and said belt roller linked thereto, a rotation of said belt roller driving said conveyor belt and the strip of material thereon through said path between said first and second zones;
    directing said material strip from said conveyor belt at said second discharge zone to said adjacent applicator roller, said rotating applicator roller releasing said strip onto said rotating core.

2. The method as claimed in claim 1 further comprising the step of providing a roller in contact with said core displaced from said applicator roller for smoothing said material strip released onto said core.

3. The method as claimed in claim 2 further comprising varying the speed of rotation of said belt roller relative to said speed of rotation of said applicator roller whereby to control the rate of belt movement and release of the strip onto said core, said belt rate controlling a stretching of the strip deposited from said conveyor belt and onto said applicator roller.

4. An applicator assembly for winding a strip of material about a rotatable core, the assembly adapted for travel along a length of the rotatable core, said applicator assembly comprising:
    a central support arm adapted for travel along a rotatable core, said support arm having a first end and a second end;
    an applicator support arm having a first end and a second end, said applicator support arm mounted to said central support arm;
    a belt roller at said first end of said applicator support arm;
    an applicator roller at said second end of said support arm, said applicator roller adapted for rolling contact with the rotatable core;
    a continuous conveyor belt wound about said belt roller, said conveyor belt defining a path passing through a gap between said belt and applicator rollers, said belt presenting a path between an upstream station adapted to deposit the material strip thereon and into said gap between said belt roller and applicator roller;
    a drive belt extending between said belt and applicator rollers and coupled thereto;
    a rotation of said core rotating said applicator roller in contact therewith, said applicator roller rotating said belt roller via said drive belt therebetween for movement of said conveyor belt coupled to said belt roller, said conveyor belt receiving the deposit of said material strip from the upstream station for transport along said path to said gap, a movement of said conveyor belt into said gap depositing said material strip from said belt onto said rotating applicator roller for subsequent deposit onto the rotatable core in contact therewith.

5. The assembly as claimed in claim 4 further comprising:
    a stitching roller support arm adapted for contact with the rotatable core, said stitching roller support arm mounted to said central support arm;
    a stitching roller attached to said stitching roller support arm, said stitching roller adapted for contact with the rotatable core, said stitching roller contacting the material strip deposited on the rotatable core for a smoothing contact therewith.

6. The assembly as claimed in claim 5 further comprising means for adjusting the displacement between said applicator roller and said stitching roller whereby said applicator roller and said stitching roller are adjustable for contact with the rotatable core.

7. The assembly as claimed in claim 6 further comprising means for adjusting the relationship of said applicator support arm and stitching roller arm with said central support arm whereby to regulate a delivery of pressure along said central support arm, said applicator and stitching roller support arms and said rollers thereon and onto the core.

8. The assembly as claimed in claim 5 further comprising:
    a pin extending from said stitching roller arm;
    a hub on said applicator roller;
    a plurality of apertures on said applicator roller hub, said pin on said stitching roller selectably positioned within one of said hub apertures upon mounting of said applicator support arm and said stitching roller support arm to said central support arm, whereby to regulate the angle between said stitching roller support arm and said applicator support arm and the distance between said stitching and applicator rollers thereon, whereby to adjust said stitching and applicator rollers according to a diameter of the rotatable core.

9. The assembly as claimed in claim 8 further comprising:
    a plurality of apertures in said central support arm;
    a bolt for extension through one of said support arm apertures, said bolt bearing against said applicator support arm, whereby to maintain said applicator support arm and said stitching roller arm at a selectable angle relative to said central support arm and said rollers on said respective arms at a selectable position relative to the rotatable core.

10. The assembly as claimed in claim 4 further comprising means for regulating the pressure of said applicator roller on the rotating core.

11. The assembly as claimed in claim 4 wherein a diameter of said applicator roller is sized relative to a diameter of said belt roller, whereby to regulate the ratio between rotation of said belt roller and said applicator roller, whereby to regulate the speed of the conveyor belt coupled thereto relative to the surface speed of the rotatable core.

12. The assembly as claimed in claim 4 wherein said applicator roller is positioned below said belt roller, whereby to enhance said deposit of said strip from said conveyor belt onto said applicator roller.

13. The assembly as claimed in claim 4 wherein said conveyor belt comprises a non-stick material.

14. The assembly as claimed in claim 4 wherein said applicator roller comprises a non-stick material.

15. An applicator head assembly for winding a strip of material received from an upstream material production station about a downstream rotatable core, the assembly attached to framework adapted for travel along a length of the rotatable core, said applicator head assembly comprising:
   a belt roller;
   an applicator roller downstream of said belt roller, said applicator roller adapted for rolling contact with the rotatable core;
   means for attaching said belt and applicator rollers to the traveling framework;
   a continuous conveyor belt wound about said belt roller, said conveyor belt defining a path between the upstream production station and adjacent said applicator roller;
   a drive belt extending between said belt and applicator rollers;
   a rotation of said core rotating said applicator roller and said belt roller via said drive belt therebetween for movement of said conveyor belt through said path, said conveyor belt receiving a deposit of said material strip from the upstream station for transport along said path towards said applicator roller, a movement of said conveyor belt past said adjacent applicator roller urging said material strip from said belt onto said applicator roller for subsequent deposit onto said rotatable core in contact therewith.

16. The assembly as claimed in claim 15 further comprising:
   a stitching roller adapted for contact with the rotatable core;
   means for mounting said stitching roller to the traveling framework, said stitching roller contacting the material strip deposited on the rotatable core in a smoothing contact therewith.

17. The assembly as claimed in claim 16 further comprising means for adjusting the displacement between said applicator roller and said stitching roller whereby to provide for contact of said applicator roller and said stitching roller on the rotatable core.

18. The assembly as claimed in claim 17 further comprising means for further adjusting the relationship of said displaced applicator rollers and support rollers relative to the framework.

19. The assembly as claimed in claim 15 further comprising means for regulating the pressure of said applicator roller on the rotating core.

20. The assembly as claimed in claim 15 wherein a diameter of said applicator roller is sized relative to a diameter of said belt roller whereby to vary the rate of rotation of said belt roller relative to the rate of rotation of the core.

\* \* \* \* \*